United States Patent [19]

Karasudani et al.

[11] 4,090,590
[45] May 23, 1978

[54] DISC BRAKE WITH POSITIVELY ACTUATED PADS

[75] Inventors: Yasuo Karasudani, Yokohama; Hiromi Yazawa, Nishimine, both of Japan

[73] Assignee: Tokico Ltd., Kawasaki, Japan

[21] Appl. No.: 734,354

[22] Filed: Oct. 20, 1976

[30] Foreign Application Priority Data

Oct. 20, 1975  Japan ................................. 50-126150

[51] Int. Cl.² .......................................... F16D 55/228
[52] U.S. Cl. ................................. 188/72.5; 188/73.4; 188/73.5
[58] Field of Search ................... 188/72.4, 72.5, 72.6, 188/73.3, 73.4, 73.5, 73.6, 205 A, 207, 367, 106 P, 368, 370, 71.3

[56] References Cited

U.S. PATENT DOCUMENTS

| 3,767,017 | 10/1973 | Maurice ............................. 188/72.5 |
| 3,773,149 | 11/1973 | Toshida et al. ................. 188/73.3 X |
| 3,951,239 | 4/1976 | Newstead ....................... 188/72.4 X |

FOREIGN PATENT DOCUMENTS

4,733,320  8/1972  Japan ................................. 188/73.4

*Primary Examiner*—Trygve M. Blix
*Assistant Examiner*—Douglas C. Butler

[57] ABSTRACT

A disc brake has a rotary disc; a pair of friction pads disposed on the opposite sides of the disc applying frictional force to the disc and a body having a first or center cylinder for receiving a center piston acting on one of the pads, at least one second or side cylinder disposed radially and outwardly of the center cylinder for receiving a second piston; a beam acting on the other pad, and a rod for transmitting the movement of the second piston to the beam, whereby when the disc brake is actuated, the first and second pistons move in the opposite directions to cause the pads to be applied against the disc.

1 Claim, 5 Drawing Figures

DISC BRAKE WITH POSITIVELY ACTUATED PADS

BACKGROUND OF THE INVENTION

This invention relates to a disc brake and more particularly, to an improved disc brake which has a relatively light weight and a high vibration resistance and which is especially suitable for a large size truck and the like.

As is apparent to those skilled in the art, the conventional disc brakes can be generally classified into (1) the opposing piston-type disc brake in which two pistons are disposed on the opposite sides of a disc to brake the disc by the action of the two pistons and (2) the stationary-type disc brake in which a single piston is disposed on only one side of the disc and the piston is operated to apply one friction pad directly against the one side of the disc to generate a reaction force which in turn applies the other friction pad secured to the housing against the other side of the disc.

In the opposing piston-type disc brake, since the hydraulically operated pistons are disposed on the opposite sides of the disc, the braking is direct and positive, but the disc brake has the disadvantages that at the time of braking, there is great possibility for occurrence of the so-called vapor lock due to frictional heat and that the overall device has a large size. On the other hand, although the stationary-type disc brake can be constructed in a relatively small size and the amount of pedal movement can be made small, this type of disc brake inevitably increases the size of the housing and brings about many problems relating to vibration resistance.

SUMMARY OF THE INVENTION

Therefore, one object of the present invention is to provide an improved disc brake which can effectively eliminate the disadvantages inherent in the conventional disc brakes referred to hereinabove.

Another object of the present invention is to provide a disc brake which utilizes only the advantages of the abovedescribed opposing piston-type and stationary-type disc brakes, which effects direct braking and which has a small size and is light in weight.

The above and other objects and attendant advantages of the present invention will be more readily apparent to those skilled in the art from a reading of the following detailed description in conjunction with the accompanying drawings which show preferred embodiments of the invention for illustration purposes only, but not for limiting the scope of the same in any way.

DETAILED DESCRIPTION OF THE PREFERRED EMBODIMENTS

Figure 1:
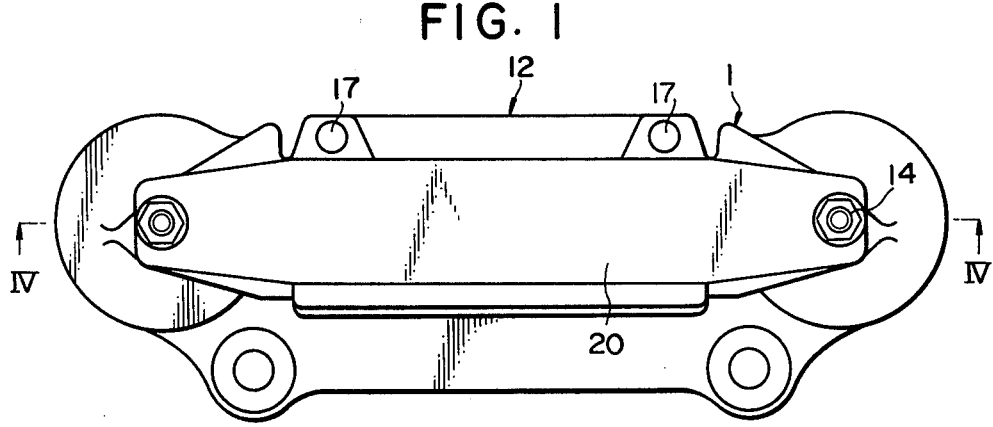
FIG. 1 is a side elevational view of a first embodiment of disc brake of the invention.
Figure 2:
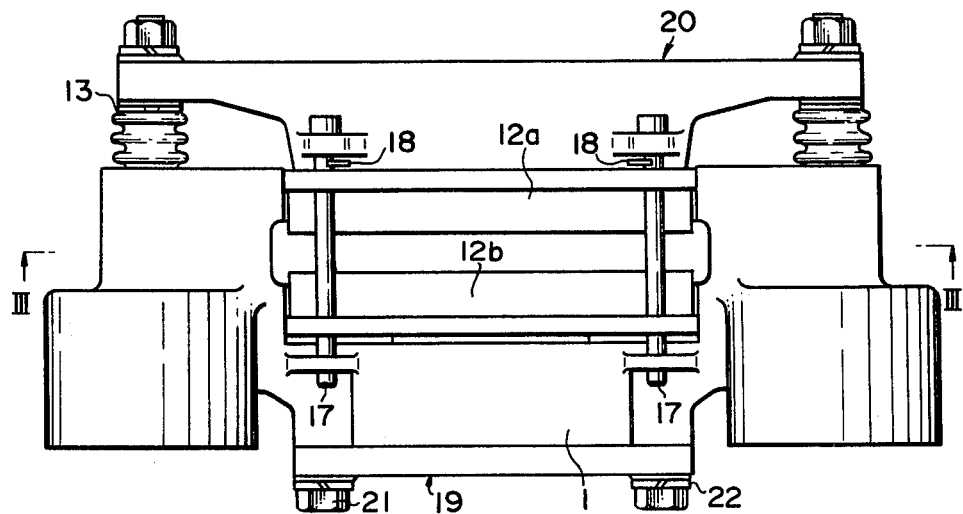
FIG. 2 is a plan view of said disc brake.
Figure 3:
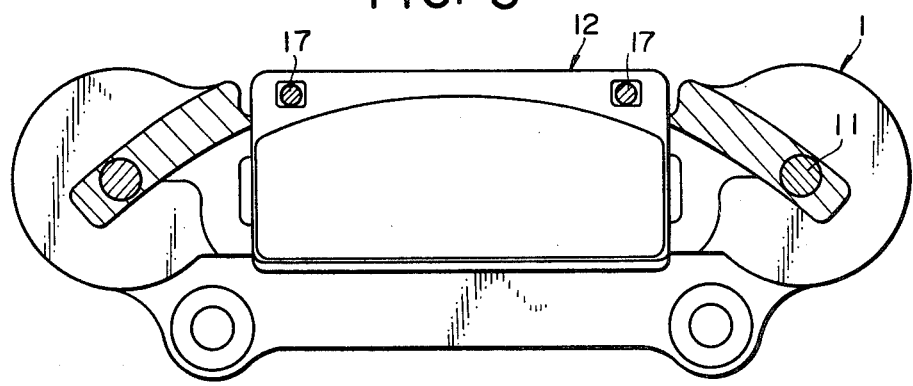
FIG. 3 is a cross-sectional view taken substantially along the line III—III and in the direction of the arrows in FIG. 2.
Figure 4:
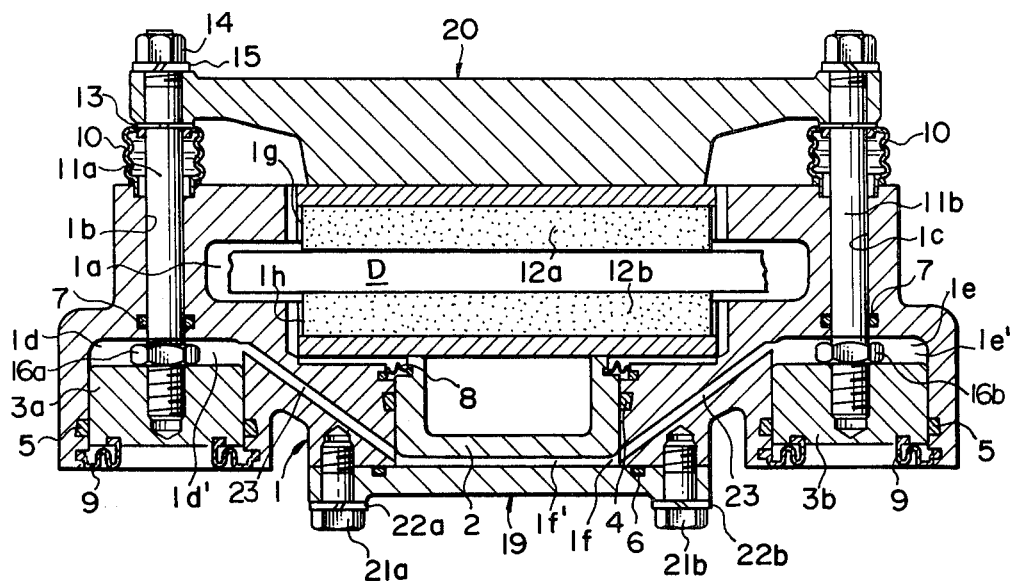
FIG. 4 is a cross-sectional view taken substantially along the line IV—IV and in the direction of the arrows in FIG. 1.
Figure 5:
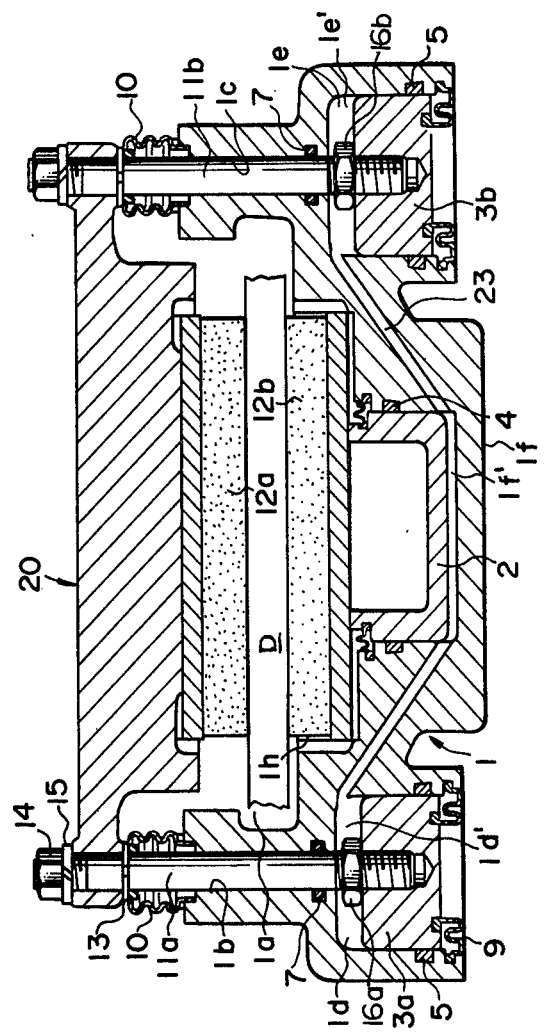
FIG. 5 is a view similar to FIG. 4, but shows a second embodiment of the invention.

The present invention will be now described referring to the accompanying drawings and more particularly, to FIGS. 1 through 4 thereof in which the first embodiment of disc brake of the invention is shown. The disc brake generally comprises a brake body 1 adapted to be secured to the body of a vehicle (not shown) in any suitable conventional manner. The brake body 1 has an elongated center opening 1a (as seen in plan) extending in a direction at right angles to the axis of the body for receiving a rotary disc D (FIGS. 4 and 5), a pair of opposite bores 1b and 1c extending parallel to the axis of the body 1 and to each other and at right angles to the longer sides of the opening 1a in positions equally spaced radially and outwardly of the opening 1a, a pair of side cylinders 1d and 1e provided at and in coaxial communication with one end of the bores 1b and 1c, respectively, a center cylinder 1f provided between and spaced from the side cylinders 1d and 1e on the opposite sides thereof and a pair of pad receiving recesses 1g and 1h provided on and in communication with the opposite sides of the elongated center opening 1a, respectively.

The pair of recesses 1g and 1h have therein a pair of conventional friction pads 12a and 12b, repsectively. The friction pads 12a and 12b are received within the respectively associated recesses 1g and 1h so that the pads are allowed to move toward and away from the opposite sides of the disc, but are prevented from rotating together with the disc.

The center cylinder 1f slidably receives a conventional U-shaped piston 2 and the inner or open side of the piston is adapted to directly contact the outer side of the friction pad 12b and the outer surface of the piston is maintained in a liquid-tight relation to the opening 1f by means of an annular seal 4 disposed at the interface of the walls of the center cylinder 1f and the outer surface of an intermediate portion of the piston 2 between the opposite sides thereof. The outer side of the center cylinder 1f is closed by a cover 19 secured to the brake body 1 by means of bolts 21a and 21b and washers 22a and 22b in a spaced relation to the outer side of the piston 2 and an O-ring 6 is disposed between the body 1 and cover 19 to thereby define a liquid-tight liquid receiving chamber 1f' between the piston and cover. Second pistons 3a and 3b are slidably received within the side cylinders 1d and 1e laterally spaced from the opposite ends of the center cylinder 1f, respectively. The piston 3a and 3b are provided in the center thereof with threaded bores for threadably receiving piston rods 11a and 11b, repsectively, which are secured to the pistons by means of nuts 16a and 16b on the piston rods respectively. The ends of the piston rods 11a and 11b remote from the pistons 3a and 3b extend through the respectively associated bores 1b and 1c, respectively. Annular seals 5 and 7 are provided at the interfaces between the walls of the side cylinders 1b and 1e and the pistons 3a and 3b and between the walls of the bores 1b and 1c and the piston rods 11a and 11b, respectively to define liquid-tight liquid receiving chamber 1d' and 1e', respectively.

The ends of the piston rods 11a and 11b which extend through the bores 1b and 1c are received within bores adjacent to the opposite ends of a beam 20 bearing the outer side of the friction pad 12a and are secured to the beam by means of nuts 14 and washers 15. Boots 10 and stop rings 13 are disposed around the piston rods 11a and 11b between the brake body 1 and beam 20 to prevent dust and other foreign matters from adhering to the portions of the piston rods 11a and 11b between the body 1 and beam 20.

The effective area of the center piston 2 is twice as large as the effective area of each of the second pistons 3a and 3b. The liquid receiving chamber 1f' on the outer side of the piston 2 is in communication with the liquid receiving chamber 1d' and 1e' by means of liquid pressure passages 23 extending between the opposite ends of center liquid receiving chamber 1f' and the side liquid receiving chambers 1d' and 1e'. With this arrangement, it is assured that liquid under pressure supplied to any one of the three liquid receiving chambers can be distributed to the other two liquid receiving chambers under the same pressure.

As well known in the art, the friction pads 12a and 12b are suspended at the opposite ends from pins 17 which are in turn supported at the opposite ends by the body 1 and beam 20, respectively. Conventional means such as clips 18 are provided on the pins 17 to prevent the pins from coming off the body 1 and the beam 20.

A boot 8 is provided between the body 1 and piston 2 on the outer side of the friction pad 12b to prevent dust and other foreign matters from adhering to the outer surface of the piston 2. Similarly, boots 9 are provided on the outer side of the second pistons 3a and 3b within the side cylinders 1d and 1e to prevent dust and other foreign matters from invading to the interfaces between the pistons 3a and 3b and side cylinders 1d and 1e, respectively.

The operation of the disc brake of the invention described hereinabove will be now described.

When liquid pressure is applied to the brake from a master cylinder or the like (not shown), the supplied liquid under pressure flows into any one of the three liquid receiving chambers through conduit means (not shown) and is then distributed to the other two liquid receiving chambers whereupon the piston 2 advances under the pressure of liquid toward the friction pad 12b to directly apply the pad against one sde of the disc and at the same time, the second pistons 3a and 3b move in the direction opposite to the advancing direction of the piston 2 or in the outward direction. As the pistons 3a and 3b move in the direction just described, the piston rods 11a, 11b secured to the pistons 3a and 3b and the beam 20 to which the piston rods 11a and 11b are also secured move together in the same direction as the pistons 3a and 3b. When the beam 20 moves in the above-mentioned direction, the friction pad 12a secured to the beam is applied against the other side of the disc, whereby forces are applied to the disc on the opposite sides thereof to brake the vehicle. More particularly, the braking forces or frictional forces provided by the frictional pads are received by the guide portions formed in the body 1 and the pad guide portions formed by extending a portion of the body to straddle the pads.

In the embodiment shown in FIGS. 1 through 4, although the liquid pressure passages 23 are formed in the brake body 1 and the outer side of the center cylinder 1f is covered by the cover 19 to define the liquid pressure chamber 1f' in communication with the side liquid receiving chambers 1d' and 1e' through the liquid pressure passages 23, instead, it is possible that the cover 19 can be eliminated and the fluid receiving chamber 1f' which communicates with the liquid pressure passages 23 is defined by the brake body 1 and the piston 2. It is also possible that separate liquid pressure guide pipes can be employed without departing from the spirit of the present invention. Similarly, the above-mentioned arrangement in which the brake body is adapted to receive the frictional forces from both the friction pads 12a and 12b may be replaced by an arrangement in which the brake body 1 directly receives only the frictional force from the friction pad 12b and the other friction pad 12a is locked to the beam 20 whereby the frictional force from the pad 12a is transmitted to the beam 20 and body 1 (see FIG. 5, for example).

With the above-mentioned construction and arrangement of the parts of the disc brakes of the invention, the disc brakes have the following advantages and features:

In most of the conventional stationary disc brakes, the cylinder section forms the floating housing member and in consequence, the housing member has a relatively great weight which brings about many problems relating to vibration resistance. With this difficulty in mind, according to the present invention, all the cylinders 1f, 1d and 1e are stationary and do not float and the beam or floating member 20 itself is very light in weight so as to thereby eliminate the problems relating to vibration resistance. In addition, the conventional disc brakes having opposing pistons are large size size and the opposing pistons are applied against the disc on the opposite sides thereof and in consequence, so-called vapor lock tends to take place frequently in the liquid pressure passages. On the other hand, according to the present invention, since the plurality of pistons are provided within the body 1 only on one side of the disc, the device can be constructed in a relatively small size and can effectively minimize the possibility of occurrence of the vapor lock. Furthermore, in the conventional disc brakes, when the pad or pads have worn away an amount corresponding to thickness L, the pistons have to be moved within the cylinders a distance 2L in order to engage the pads and the disc. However, according to the present invention, since the center and side pistons move within their respectively associated center and side cylinders in the opposite directions, a full braking force can be obtained by merely moving the pistons by the distance corresponding to the thickness L in the opposite directions. Thus, the disc brake of the invention can be made smaller in size than the conventional stationary disc brakes to thereby improve the layout of the disc brake relative to the design of the vehicle in conjunction with which the disc brake is employed. Furthermore, the piston 2, the pistons 3a and 3b and the piston rods 11a and 11b are protected against dust by the cover 19 and boot 8, by the boots, 9 and by the boots 10, respectively whereby all the movable parts are completely sealed and the problems relating to the smooth movement of the brake housing inevitable in the conventional stationary disc brakes can be effectively eliminated.

While only two embodiments of the invention have been shown and described in detail it will be understood that the same are for illustration purpose only and not to be taken as a definition of the invention, reference being had for this purpose to the appended claims.

What is claimed is:

1. A disc brake comprising: a rotary disc; a pair of friction pads disposed on opposite sides of said disc for application against said opposite sides of the disc; a body adapted to be secured to the body of a vehicle and having a center cylinder positioned on one side of said disc and a first piston in said center cylinder acting on one of said friction pads, and further having a pair of side cylinders spaced laterally from said center cylinder on said one side of the disc and each having a second piston therein; a pair of piston rods each having one end adjustably connected to a corresponding second piston for adjustment relative to the corresponding piston in the direction of the length of said piston rod and extending slidably through said body; and a beam disposed on the other side of said disc and acting on the other friction pad and being secured to the other ends of said piston rods, whereby when said brake is actuated, said first piston operates in one direction for applying said one friction pad against said one side of the disc and at the same time, said second pistons operate in the opposite direction for moving said beam toward the other friction pad so as to apply the other friciton pad against the other side of the disc.

* * * * *